Oct. 30, 1951     J. W. STAFFORD ET AL     2,573,070
RANGE INDICATING SYSTEM
Filed Feb. 18, 1944

INVENTOR.
RAYMOND L GARMAN &
JEROME W STAFFORD
BY
*William D Hall*
Attorney

Patented Oct. 30, 1951

2,573,070

UNITED STATES PATENT OFFICE 2,573,070

RANGE INDICATING SYSTEM

Jerome W. Stafford and Raymond L. Garman, Cambridge, Mass., assignors, by mesne assignments, to the United States of America as represented by the Secretary of War Application February 18, 1944, Serial No. 522,937

14 Claims. (Cl. 343—13)

This invention relates to a radar system for determining the existence and range of targets from a predetermined location, and particularly to a range channel of the radar system, this range channel being provided with a full range oscilloscope and a vernier range oscilloscope for obtaining more accurate range determinations.

In the use of a system of this character, accurate target distance resolution becomes a problem when the range of the system is quite large. Thus the conventional system has a cathode ray tube upon which the entire range is laid out on the time axis of the screen. Due to unavoidable departures from precise sweep linearity as well as poor image definition, it may be difficult to obtain as precise a range reading from the cathode ray tube screen as the remainder of the system would normally permit. Nevertheless it is essential that a cathode ray tube have a sweep corresponding to the maximum range of the system so that the existence and location of all targets be given. In many instances, however, it is highly desirable to concentrate on one particular target, provide means for determining the target range with a high degree of precision and to follow the target with corresponding accuracy.

In general, the invention provides a cathode ray tube upon the screen of which is presented in expanded form a fixed predetermined portion of the entire range of the system. The sweep duration of this cathode ray tube is less than the duration of a normal full range tube sweep upon which the maximum range of the system may be presented. The initiation of this shortened sweep is delayed with respect to the transmitted pulse to provide a predetermined adjustable delay in time corresponding to an adjustable range. Within this expanded range, proper target presentation may be provided. The precise range may be read off by suitable means, taking into consideration the delay of the shortened sweep with respect to the transmitted pulse. Thus the system provides a vernier range cathode ray tube upon which a preselected portion of the entire range is presented in highly expanded form with a resultant increase in accuracy of resolution. The invention may be applied to either electrostatic or magnetic sweeps.

It is therefore an object of this invention to provide a radar system having a full range channel and a vernier range channel for obtaining, more accurately, range determinations by means of the vernier range oscilloscope, and a multivibrator circuit connected to the transmitting channel on its input side, the output of which is used for controlling the sweep of the vernier range oscilloscope.

An additional object of this invention is to provide a radar system having full range and vernier range oscilloscopes and circuits for controlling and synchronizing the operation of the vernier range oscilloscope with the operation of the radar system.

These and other objects will become more apparent from the following description taken together with the drawings in which.

Figure 1:
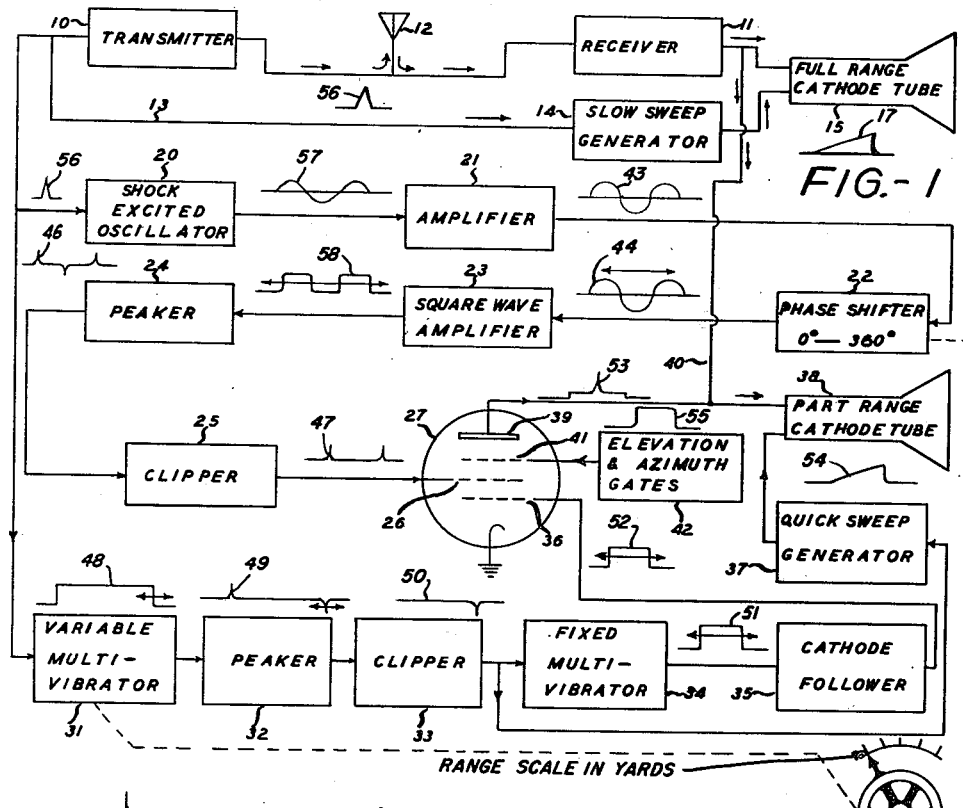
Figure 1 is a block diagram of the range system.

Referring to Fig. 1, the system in general comprises a conventional radar transmitter 10 and receiver 11 coupled together and cooperating with a common antenna 12. If desired, two separate antennas may be provided. The transmitter and receiver may operate in the usual fashion and may have any suitable means for pulsing the transmitter at a predetermined repetition frequency. Inasmuch as such systems are well known in the art, no detailed description thereof will be given. It is understood, of course, that suitable means are provided for protecting the receiver from any damage by transmitted energy during transmission.

As shown here, a line is taken from the transmitter for providing the rest of the system with pulses simultaneous with or at a fixed time with respect to the pulsing of the transmitter. In the event that a separate timer such as a synchronizing oscillator, is used for controlling the transmitter, such pulses may be taken from the timer. Pulses 56 from the transmitter are fed from a line 13 into a slow sweep generator 14 and thence to the sweep control portion of a first cathode ray tube 15, which is the full range oscilloscope. The duration of the sweep wave 17 is long enough to accommodate the maximum range of the system and, in accordance with well known practice, will be almost 11 microseconds for each mile of range. It is understood that the pulse repetition frequency of the transmitter is low enough so that a comparatively long time interval between adjacent transmitter pulses is provided.

A connection from the receiver to the full range cathode ray tube 15 is also provided so that all targets reflecting echoes may be presented on the screen of this cathode ray tube.

Trigger pulses 56 from the transmitter are also fed to the vernier range system shown for determining the range of a target with greater accuracy. To this end, trigger pulses 56 are fed into a shock-excited oscillator 20 which may, for purposes of accuracy, have a crystal incorporated therein. This shock-excited oscillator, as is well known in the art, is adapted to produce a train of accurately calibrated waves 57 for each trigger impulse. The duration of the train is equal to the maximum range of the system but less than the time interval between adjacent trigger impulses. The frequency of the shock-excited oscillator may be any desired value to provide range marks at convenient range intervals. Thus if the system is to be used over water, with a range unit of a nautical mile, the frequency may be somewhat higher than 80,000 cycles per second. Other frequencies corresponding to a mile, 1,000 yards or other units of distance, may be chosen.

The output 57 of the shock-excited oscillator is fed to a suitable amplifier 21 to provide, what may be for all practical purposes, a train of sine waves 43 of uniform amplitude. The amplified output may then be fed into a phase shifter 22 adapted to shift the phase of the wave train 43 from 0° to 360° with reference to the output of oscillator 20. The shifter itself may be a combination of resistance and condenser or any other device and is well known in the art. The actual amount of shift may be controlled by moving a condenser or resistance.

The output 44 of phase shifter 22 is fed into a squaring amplifier 23 which, as is well known, consists of an overdriven amplifier and several additional stages to make practically rectangular waves 58 out of the original sine waves. The squared output 58 is then fed into a suitable peaker 24 which differentiates wave 58 and produces a series of positive and negative pulses 46; these are impressed on a clipper 25 which will provide only positive pips 47 corresponding to the vertical leading sides of the rectangular waves 58.

The positive pips 47 are used for range markers and may be fed into one of the grids 26 of a multi-grid coincidence tube 27.

The trigger pulses 56 from the transmitter are also fed to a biased variable multivibrator 31. Multivibrator 31 generates a rectangular delay pulse 48 the duration of which may be adjusted from a minimum value of zero up to a maximum value of the order of the duration of sweep wave 17 impressed on the deflecting means of the first cathode ray tube 15. In other words, the maximum time duration of the delay pulse 48 is approximately equal to the time of travel of electromagnetic waves from the antenna to a target at maximum range and back again.

The delayed pulse output of variable multivibrator 31 is fed to a peaker 32 and clipper 33 to yield pips 49 corresponding to the trailing edge of the delay pulse. The output signal 50 of clipper 33 is impressed on a fixed gate multivibrator 34 which generates a rectangular voltage pulse 51 having a time duration generally of the order of but somewhat less than the period of one shock-excited wave 57 and functioning as a gate in the subsequent circuits. Thus if the shock-excited oscillator is calibrated at 80,000 cycles per second, the period of the wave 57 would then be 12½ microseconds. Multivibrator 34 may therefore be designed to give a rectangular voltage pulse 51 having a time duration of about 8 or 10 microseconds. The output of gate multivibrator 34 is impressed on a cathode follower 35 and thence on the control grid 36 of a vacuum tube 27.

Pulse 50 is also impressed on a quick sweep generator 37 so that the sweep generator is triggered by the trailing edge of rectangular wave 48. Sweep generator 37 provides a sweep 54 for a cathode ray tube 38, the sweep duration being made equal to the duration of the rectangular gate pulse 51. Second cathode ray tube 38, which is the vernier range oscilloscope, is connected to the anode of tetrode 27, and, by a lead 40, to the receiver. If desired, an additional grid 41 may have a control pulse 55 (of positive polarity) impressed on it from an antenna control means such as an elevation and azimuth control 42. In such a case, the system will operate only during predetermined parts of an antenna scanning operation. Since such scanning systems are well known, no details are given. In any event, second tube 38 will show both target and marker indications.

The second cathode ray tube is thus provided with a sweep wave 54 having a fixed duration but having an adjustable time delay with respect to the trigger pulse from the transmitter. While the range may be read off directly in an approximate fashion from the first cathode ray tube, it is clear that the second cathode ray tube showing only an enlarged portion of the range axis cannot itself directly indicate range. The position of the range portion shown on the second cathode ray tube depends upon the delays introduced by variable multivibrator 31. To this end, the control for varying the duration of the rectangular output of variable multivibrator 31 is tied to a suitable hand wheel 45.

The actual control itself, which may be either resistance or condenser in a multivibrator, is preferably calibrated so that a predetermined hand wheel position corresponds to a computed time or range, as the case may be, of the marker pulse presented. It is desirable that the presentation of range should be at one position, normally at the hand wheel. To this end, it is necessary to provide means for maintaining a constant phase between the marker pulse 47 and the gate pulse 51 in the output of multivibrator 34. In other words, it is desirable that the one small marker pulse presented by the second cathode ray tube be fixed with relation to the initiation of the sweep wave 54 of the second cathode ray tube. For this, the 360° phase shifter 22 has its control suitably calibrated and coupled to hand wheel 45 so that this constancy of relationship is maintained.

The operation of the system is as follows. Assuming that the system is trained on a desired target as may be evidenced by a target echo in the full range cathode ray tube, hand wheel 45 is actuated to bring the desired target echo on the screen of the vernier range cathode ray tube. As hand wheel 45 is turned, the variable delay, in this instance multivibrator 31, is operated to control the time of initiation of each quick sweep 54 with respect to a pulse transmitted from the antenna. Thus the small portion of the range presented by the second or vernier range cathode ray tube is moved along the maximum range of the system until the portion of the range presented by the second cathode ray tube includes the desired target.

As disclosed here, the quick sweep having duration of about 8 microseconds may thus represent a range portion of a bit more than $\tfrac{1}{16}$ of a mile. Hence, as hand wheel 45 is turned, this range portion, for convenience we will call it $\tfrac{1}{16}$ of a mile, may be moved over so that it may either represent the first $\tfrac{1}{16}$ mile of the maximum range of the system or some intermediate $\tfrac{1}{16}$ mile or even the last $\tfrac{1}{16}$ mile of the maximum range of the system.

Due to the simultaneous operation of the controls of multivibrator 31 and phase shifter 22, the marker pulse 47 (or 53, as it appears in the output of tube 27) and the fast sweep wave 54 will be maintained in fixed phase relationship with respect to each other. Hence the marker pulse will appear stationary on the screen as wheel 45 is actuated. Target echoes will move by and when alined with the marker pulse will be properly indicated as to range on wheel 45.

If the quick sweep duration were exactly that of the fixed gate, there would be little necessity for the gate. However, in order to obtain a more linear sweep, for example, it may be desirable to generate a longer sweep and blank out the undesired part of the sweep by the gate. This gate pulse then controls the beam visibility. Therefore, when the fast sweep 54 is made longer than the gate pulse 52, the gate pulse 52 is made to appear in the plate output of tetrode 27, together with the marker pulse 47. The resulting signal 53 is then impressed on the intensity grid of the vernier range oscilloscope where it overcomes the normal negative biasing potential impressed on the intensity grid, which normally blocks the electron beam. In the arrangement of this type the marker pulse is used for intensifying the image of the selected echo signal. It is also possible to eliminate the coincidence tube as the desired marker pulse will be the only one presented on the screen. For precise control as well as gating by antenna bearing, the coincidence tube is provided.

Figure 2:
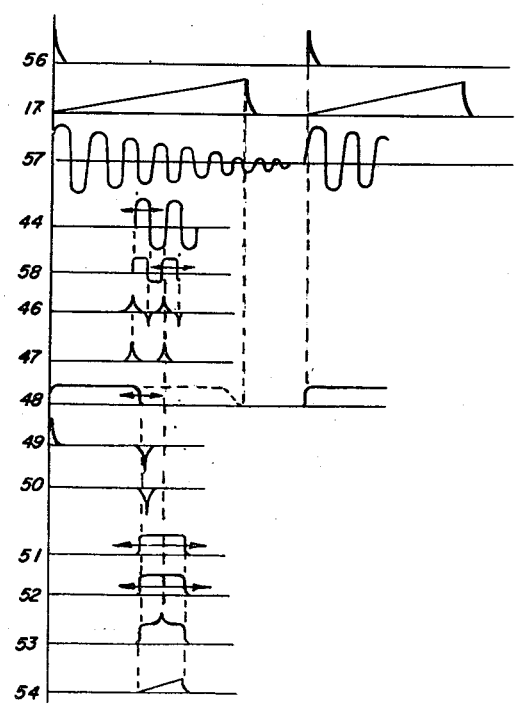
Figure 2 illustrates the oscillograms of signals appearing in the circuits of Fig. 1 in their proper phase relationship with respect to each other.

Fig. 2 illustrates the oscillograms of the signals in their proper phase relationship. Pulse 56 is a transmitted pulse, or a pulse from a synchronizing oscillator, or a blocking oscillator, depending upon the type of modulation used in the transmitting channel. In either case it determines the time of transmitting the exploratory pulse, which corresponds to "zero time" designated by "zero time line" in Fig. 2. The sawtooth wave 17 produces the horizontal base line in the full range cathode ray oscilloscope 15. The amplitude and the duration of this wave is adjusted to produce full deflection of the electron beam in tube 15, and the duration of this wave is adjusted to correspond to the full range of the system. Since the transmitting channel pulse 56 is used for controlling the shock-excited oscillator 20, the starting period of wave 57, appearing in the output of the shock-excited oscillator, coincides with the starting period of pulse 56. Wave 44, appearing in the succeeding line, is identical to wave 57 except that the time relationship of wave 44 with respect to the "zero time line" can be varied by adjusting the setting of phase shifter 22. This is illustrated by a doubleheaded arrow in the figure. The phase of the rectangular wave 58 and of the pulses 46 and 47 is determined by the phase of wave 44. The rectangular wave 48 is the wave appearing in the output of the variable multivibrator 31. The starting time of wave 48 coincides with the "zero time line," and the time when this multivibrator reverts to its original position may be varied by varying the R-C combination in this multivibrator by means of the handwheel 45. Signal 49 represents the output of peaker 32 and signal 50 represents the output of clipper 33. The time of occurrence of the signals 50 is controlled by the variable multivibrator 31, the latter in turn being controlled by handwheel 45. Accordingly, the time of occurrence of pulse 50 is under the control of the operator. Pulse 50 is used for timing fixed multivibrator 34, the output of which is illustrated at 51. Since the phase pulse 50 can be either advanced or retarded by handwheel 45, it follows that the same is true of the pulses 51 and 52. Since pulse 50 is used for timing the quick-sweep generator 37, the saw-tooth wave 54 will be in synchronism and in phase with pulse 50. The marker pulse 47 and the rectangular wave 52 are combined in tetrode 27, and the resulting combination-pulse 53 appears in the output of this tube. This pulse is impressed on the cathode ray tube 38 or tubes 38 and 15, depending on the indications desired, where it is used for aligning the desired echo with marker pulse 47. This is accomplished by simultaneously varying the phases of the waves 44 and 48 by turning handwheel 45.

For training purposes, the receiver may be omitted and echoes may be generated by the marker pulses.

What is claimed is:

1. A radar system including a source of regularly recurrent trigger pulses, means, controlled by said source, for generating a train of marker pulses after each trigger pulse, the time between successive marker pulses being small compared to the time between successive trigger pulses, a first variable network for shifting the phase of said marker pulses, a cathode ray tube having a screen, a sweep generator for generating a sweep for said tube with the sweep duration being small compared to the time between successive trigger pulses, a second variable delay network, controlled by said trigger pulses, for initiating the operation of said sweep generator whereby one sweep is generated after each trigger pulse, said first and second variable networks being mechanically coupled together whereby a marker pulse occurs at a fixed time after the initiation of said sweep, and a connection between said tube and said means for presenting said marker pulse indications on the screen of said tube.

2. A radar system including a source of regularly recurrent trigger pulses, means, controlled by said source, for generating a train of sine waves after each trigger pulse, the train duration being less than the time between successive trigger pulses with the period of the sine wave being small compared to the time duration between successive trigger pulses, variable means for shifting the phase of said sine waves, means for deriving marker pulses from said shifted sine waves, a cathode ray tube having a screen, a sweep generator for said tube, the sweep duration thereof being small compared to the time between said successive trigger pulses, variable delay means controlled by said trigger pulses for operating said sweep generator to provide one sweep after each trigger pulse, said two variable means being mechanically coupled together and phased to make a marker pulse occur at a fixed time after the initiation of said sweep, and means for presenting marker pulse indications on the screen of said tube.

3. A radar system including a source of regularly recurrent trigger pulses, means controlled by said source for generating a train of marker pulses after each trigger pulse, the time between successive marker pulses being small compared to the time between successive trigger pulses, normally inoperative means for generating a gate voltage having a time duration somewhat less than the time between successive marker pulses, variable delay means initiated by each of said trigger pulses for rendering said gate voltage generating means operative to generate a single gate voltage for said trigger pulse, variable means for shifting the phase of said marker pulses, said two variable means being mechanically coupled to combine each gate voltage with a marker pulse voltage in a fixed phase between the gate and marker voltages over the range of operation, a cathode ray tube having a screen, means for generating a sweep for said cathode ray tube for each gate with at least part of said sweep being simultaneous with said gate voltage, and means for presenting said gate and marker voltages on said screen.

4. In a radar system, the combination of a transmitter for transmitting exploratory pulses, a receiver for receiving echoes of said exploratory pulses, and an antenna connected to said transmitter and receiver, said transmitter being pulsed by trigger pulses, means, controlled by said trigger pulses, for generating a train of marker pulses after each trigger pulse, the time between successive marker pulses being small compared to the time between successive trigger pulses, a first variable delay means for shifting the phase of said marker pulses, a cathode ray tube having a screen, a sweep generator connected to said tube and having a sweep duration small compared to the time between said successive trigger pulses, a second variable delay means controlled by said trigger pulse to operate said sweep generator for generating one sweep after each trigger pulse, said first and second variable means being mechanically coupled and synchronized to make said marker pulse occur at a fixed time after the initiation of said sweep, and means for presenting said echoes and said marker pulse on said screen, said second variable means having a range indicating means for showing the target range when a target echo is alined with a marker pulse occurring after the initiation of said sweep.

5. In a radar system, a transmitter for transmitting exploratory pulses, a receiver for receiving echoes of said exploratory pulses, and an antenna connected to said transmitter and receiver, said transmitter being pulsed by trigger pulses, means, controlled by said trigger pulses, for generating a train of sine waves after each trigger pulse, duration of said train being less than the time between successive trigger pulses, and the period of the sine wave being small compared to the time between successive trigger pulses, a first variable delay means for shifting the phase of said sine waves, means for deriving marker pulses from said sine waves, a cathode ray tube having a screen, a sweep generator connected to said tube and having a sweep duration small compared to the time between successive trigger pulses, a second variable delay means controlled by a trigger pulse to operate said sweep generator for generating only one sweep after each trigger pulse, said first and second variable means being mechanically coupled together causing a marker pulse to occur at a fixed time after the initiation of said sweep, and means for presenting said echoes and said marker pulses on said cathode-ray tube, said second variable means including an indicating means giving the range of a target whose echo is alined with the marker pulse first occurring after the initiation of said sweep.

6. In a radar system, a transmitter for transmitting exploratory pulses, a receiver for receiving echoes of said exploratory pulses, and an antenna connected to said transmitter and receiver, said transmitter being pulsed by a source of trigger pulses, means, connected to and under control of said source of trigger pulses, for generating a calibrated train of marker pulses after each trigger pulse, the time between successive marker pulses being small compared to the time between successive trigger pulses, normally inoperative means for generating a gate pulse having a time duration somewhat less than the time between successive marker pulses, a first variable delay means energized by a trigger pulse for rendering said generator operative to generate a single gate pulse, a second variable delay means for shifting the phase of said marker pulses, said first and second variable delay means being mechanically coupled causing the time incidence of each gate pulse to contain a marker pulse having a fixed phase between the gate and the marker pulses over the range of operation of said system, indicating means forming a part of said second variable means for indicating in terms of range the relationship of the marker pulse coinciding with the gate pulse with respect to the trigger pulse, a cathode ray tube having a screen, means for generating a sweep for said tube for each gate pulse with at least part of said sweep being simultaneous with said gate pulse, means for feeding echoes from said receiver to said cathode ray tube, and means for presenting on said screen said gate pulse, said marker pulse and those echoes which coincide in time with said gate pulse whereby movement of said first and second variable means brings a selected echo in line with a gated marker pulse, and said movement produces, the range indications, on said second means, for said selected echo.

7. The system as defined in claim 6 which also includes an additional cathode ray tube, having a screen, sweep generating means for said additional tube, said sweep generating means being triggered by said trigger pulses to provide one sweep for each pulse with the sweep having a duration corresponding to the maximum target range of the system, and means for generating full range echo indications on the screen of said additional tubes.

8. In a radar system, a transmitter for transmitting exploratory pulses, a receiver for receiving echoes of said exploratory pulses, and an antenna connected to said transmitter and receiver, said transmitter being pulsed by trigger pulses, a calibrated oscillating circuit shock-excited by each trigger pulse into generating a train of sine waves, the period of the sine wave being small compared to the time between successive trigger pulses, and the entire train enduring for less than the time between successive trigger pulses, a phase shifter for shifting the phase of said waves, means for deriving range marker pulses from said shifted waves, normally inoperative gate generator for generating a gate pulse having a time duration somewhat less than the time between successive marker pulses, variable delay means energized by a trigger pulse for rendering said gate generator operative to generate a single gate per trigger pulse, said phase shifter and variable delay means being mechanically coupled to provide a fixed phase relationship between each gate and a gated marker pulse which is in phase with said gate, indicating means connected to said variable delay means for giving the equivalent range indication corresponding to the time delay between a trigger pulse and said gated marker pulse, a cathode ray tube having a screen, means for generating a sweep for said tube for each gate with at least part of said sweep occurring simultaneously with said gate pulse, means for impressing echoes from said receiver on said cathode ray tube for echo presentations on said screen, and means for presenting gate and marker pulse indications on said screen, whereby when a target echo is alined with said gated marker pulse the range is given by said indicating means.

9. The system as defined in claim 8 which also includes an additional cathode ray tube having a screen, means for generating a full range sweep for said second tube, said sweep being triggered by a trigger pulse, and connections from said receiver to said additional cathode ray tube for presenting all echoes within the range of said system.

10. A radar system including a transmitter for transmitting exploratory pulses, a receiver for receiving echoes of said exploratory pulses, and an antenna connected to said transmitter and receiver, said transmitter being pulsed by trigger pulses, a resonant circuit, shock-excited by each trigger pulse whereby a train of sine waves is generated by said circuit, said train having a shorter duration than the time interval between successive trigger pulses, with the period of each sine wave in said train being small compared to the time interval between successive trigger pulses, means for deriving marker pulses from said sine waves, a phase shifter for shifting the phase of said sine waves and of said marker pulses, a normally inoperative multivibrator triggered by each trigger pulse to generate a rectangular wave, said multivibrator having a variable network for varying the time duration of said rectangular wave, said network being provided with a range scale, a fixed multivibrator controlled by the trailing edge of said rectangular wave said fixed multivibrator generating a gate pulse, said phase shifter and said network being mechanically coupled together to make the position of a marker pulse with respect to said gate pulse to be constant, a cathode ray tube having a screen, means for generating a sweep for said cathode-ray tube for each gate pulse with at least part of said sweep being simultaneous with said gate pulse, connections for presenting target echo indications from said receiver on the screen of said cathode-ray tube, and means for presenting gate and marker pulse indications on said screen whereby when an echo is alined with a marker pulse the range may be read off on said range scale.

11. A radar system as defined in claim 10 which also includes a multigrid vacuum tube providing a coincidence device, with marker and gate pulses being fed therethrough prior to reaching said cathode ray tube.

12. In a radar system, a transmitter for transmitting exploratory pulses, a receiver for receiving echoes of said exploratory pulses, and an antenna connected to said transmitter and receiver, said transmitter being pulsed by trigger pulses, a calibrated resonant circuit, means for shock-exciting said circuit by each trigger pulse whereby a train of sine waves is generated by said resonant circuit, said train having a shorter duration than the time interval between successive trigger pulses, with the period of each sine wave being small compared to the time interval between successive trigger impulses, means for deriving marker pulses from said shock-excited waves, a phase shifter for shifting the phase of said sine wave and of said marker pulses, a normally inoperative multivibrator triggered by each trigger pulse to generate a single rectangular wave, said multivibrator having a variable network for varying the time duration of said rectangular wave, said network being provided with a range scale, a fixed multivibrator controlled by the trailing edge of said rectangular wave said fixed multivibrator generating a gate pulse, said phase shifter and said network being mechanically coupled together to make the position of a marker pulse with respect to said gate pulse to be constant, a cathode ray tube having a screen, means for generating a sweep for said tube for each gate pulse with at least part of said sweep being simultaneous with said gate pulse, connections for presenting target echo indications from said receiver on the screen of said cathode-ray tube, a vacuum tube having a plurality of control electrodes, means for impressing the marker pulses on one of said electrodes, means for impressing said gate pulse on another of said electrodes, and means for impressing a bearing data gate on a third control electrode, said vacuum tube functioning as a coincidence device, and connections from said vacuum tube to said cathode ray tube whereby a marker pulse occurring within said gate pulse and coinciding with said bearing data gate pulse is passed through said vacuum tube and to said cathode ray tube for their reproduction on the screen of said cathode-ray tube.

13. A radar system including a transmitting channel transmitting exploratory pulses, a receiver for receiving echoes of said exploratory pulses, a full range oscilloscope connected to said receiver and reproducing on its screen all echoes in their proper time relationship, a sine wave generator connected to and controlled by said transmitting channel, a phase shifter connected to said sine wave generator, a marker pulse generator connected between said phase shifter and a vernier range oscilloscope, a fast sweep generator connected between said vernier range oscilloscope and a variable delay network, said network being connected to and controlled by said transmitting channel, a connection between said receiver and said vernier range oscilloscope for reproducing any desired, selectable portion of the full range on the screen of said vernier range oscilloscope, and means for simultaneously varying the setting of said network and said phase shifter, said means enabling the selection of any portion of the full range for the reproduction of the selected portion on the screen of said vernier range oscilloscope.

14. A radar system as defined in claim 13 in which said means includes a range scale operated by said means for direct range determination of an object producing an echo, when the image of said echo, as reproduced on the screen of said vernier range oscilloscope, is aligned, with the aid of said means, with an image, on the same screen, of said marker pulse.

JEROME W. STAFFORD.
RAYMOND L. GARMAN.

REFERENCES CITED

The following references are of record in the file of this patent:

UNITED STATES PATENTS

| Number | Name | Date |
|---|---|---|
| 2,420,516 | Bischoff | May 13, 1947 |
| 2,422,204 | Meacham | June 17, 1947 |
| 2,423,304 | Fitch | July 1, 1947 |
| 2,426,501 | Hart | Aug. 26, 1947 |
| 2,432,196 | Hershberger | Dec. 9, 1947 |